(12) United States Patent
Allan

(10) Patent No.: US 7,519,702 B1
(45) Date of Patent: Apr. 14, 2009

(54) METHOD AND APPARATUS FOR MEASURING WEB SITE PERFORMANCE

(75) Inventor: Ron C. Allan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1101 days.

(21) Appl. No.: 09/637,330

(22) Filed: Aug. 10, 2000

(51) Int. Cl.
G06F 15/173 (2006.01)

(52) U.S. Cl. ............... 709/224; 709/201; 709/202; 709/203; 709/217; 345/735; 345/743

(58) Field of Classification Search ............ 709/224, 709/202, 201, 203, 217; 713/400; 345/735, 345/743
See application file for complete search history.

(56) References Cited

U.S. PATENT DOCUMENTS

| | | | | |
|---|---|---|---|---|
| 5,796,952 | A | 8/1998 | Davis et al. | 395/200.54 |
| 6,006,260 | A * | 12/1999 | Barrick et al. | 709/224 |
| 6,408,335 | B1 * | 6/2002 | Schwaller et al. | 709/224 |
| 6,438,702 | B1 * | 8/2002 | Hodge | 713/400 |
| 6,563,517 | B1 * | 5/2003 | Bhagwat et al. | 345/735 |
| 6,728,753 | B1 * | 4/2004 | Parasnis et al. | 709/203 |

FOREIGN PATENT DOCUMENTS

JP  11-203224  7/1999

* cited by examiner

Primary Examiner—Tammy Nguyen
Assistant Examiner—Thanh Tammy Nguyen
(74) Attorney, Agent, or Firm—Yee & Associates, P.C.; Jeffrey S. LaBaw

(57) ABSTRACT

A web site is provisioned with a proxy that receives a page request intended for the server and records a first time. The page request is then forwarded to the server for response. The response stream generated by the server is intercepted at the proxy at a second time. As the stream is forwarded to the requesting client, the proxy inserts a page script that, upon execution at the client, calculates a page render time. This time is determined by calculating the difference between a third time (the time at which the page script begins execution at the client) and a fourth time (a time at which the page rendering is complete). Upon completion of the page rendering, the script opens a connection back to the server and returns a packet that includes the page render time. This packet is received at a fifth time. A transaction record is then built by the proxy using the timestamp data.

10 Claims, 4 Drawing Sheets

METHOD AND APPARATUS FOR MEASURING WEB SITE PERFORMANCE

This application contains subject matter protected by Copyright Law. All rights reserved.

BACKGROUND OF THE INVENTION

1. Technical Field

The present invention relates generally to client-server technologies and, in particular, to techniques for enabling web sites to collect HTTP transaction performance information such as an approximate round trip time, an approximate page render time at the client, a request service time at the server, and the like.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator) at a client machine involves specification of a link via the URL. In response, the client makes a request to the server identified in the link and, in return, receives a document or other object formatted according to HTML. A collection of documents supported on a Web server is sometimes referred to as a Web site.

As consumer-to-business e-commerce increases on the Internet, a business will want to gather metrics that reflect its customer's experience with the Internet business services provided from the site. One such metric is the "total round trip time" for a given transaction, which represents the total time necessary to process a given HTTP transaction from the time the request is issued to the server until the page is fully rendered on the client. The total round trip time includes a number of elements: the server response time, the client page display time, and the time spent on the network.

It is known in the prior art to provide specialized software to facilitate calculation of such performance metrics. In one scheme, a user of a client machine must download and install a client-side agent that is used to calculate the total round trip time. The agent, in effect, starts a timer when the page request is issued, and the software then determines the total round trip by determining when the page has been rendered. This technique, however, is obtrusive, and it does not provide information about the server response time (except to the extent that such data is included in the total round trip time). Of course, when given the choice, most users will not install and/or use such monitoring agents.

There remains a need in the art to provide an improved technique for enabling sites to monitor HTTP transaction performance, preferably without involvement from the user of the client machine.

BRIEF SUMMARY OF THE INVENTION

A proxy is associated with a web server to perform performance monitoring for a given web site. The proxy receives a page request intended for the server and records a first time T1. The page request is then forwarded to the server for response. The response stream generated by the server is intercepted at the proxy at a second time T2. As the stream is forwarded to the requesting client, the proxy inserts into the stream a page script that, upon execution at the client, calculates a page render time. This time is determined by calculating a difference between a third time (the time at which the page script begins execution at the client) and a fourth time (a time at which the page rendering is complete). Upon completion of the page rendering, the script opens a connection back to the server and returns a packet that includes the page render time. This packet is received at a fifth time T5. A transaction record is then built by the proxy using the timestamp data. This record includes a request service time (the difference T2–T1), an approximate page render time (the difference T4–T3), an approximate time "on the wire" ((T5–T2)–(T4–T3)), and a total round trip time [(T2–T1)+(T4–T3)+((T5–T2)–(T4–T3))], or (T5–T1).

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
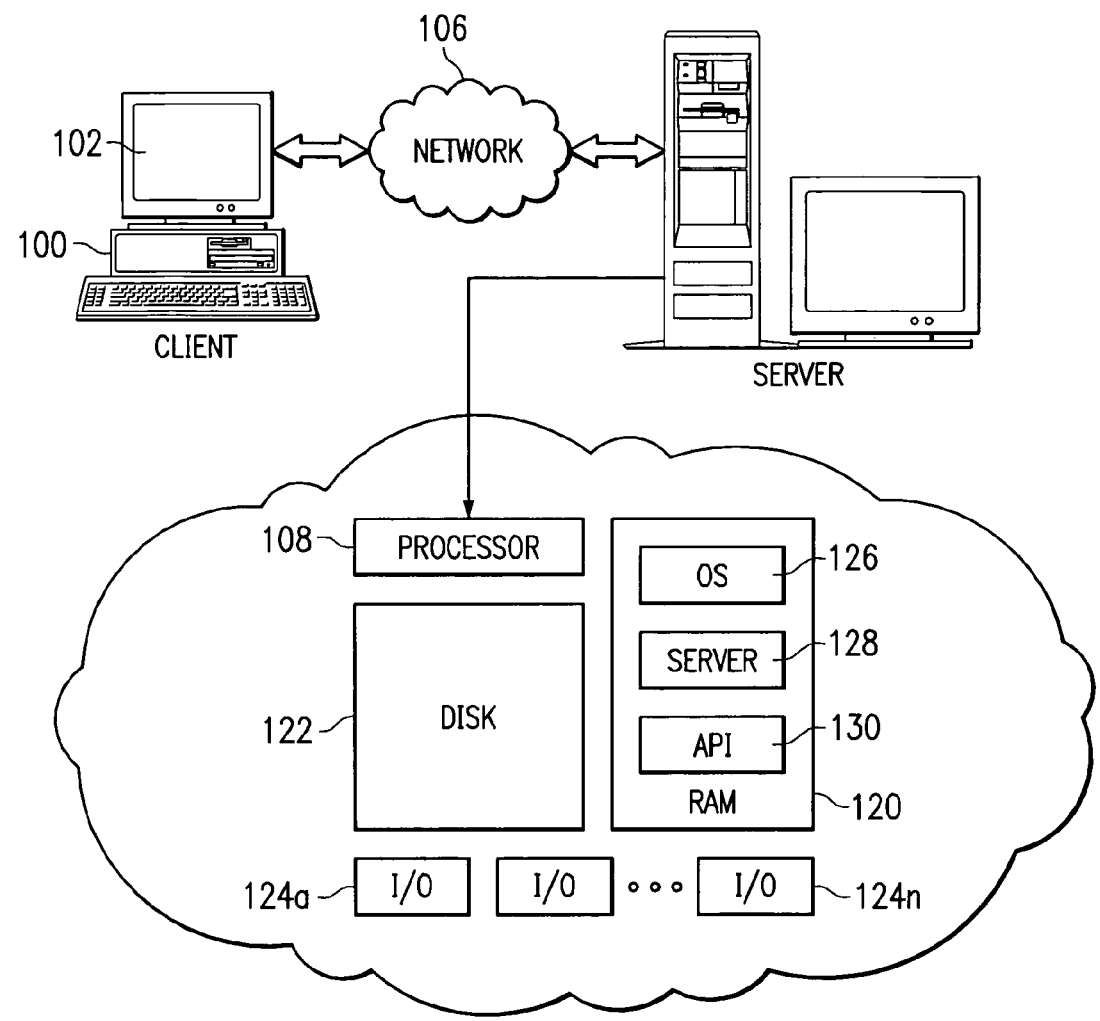
FIG. 1 is a simplified illustration of a known client-server computing environment in which the present invention may be implemented.

The present invention is a web site performance monitor operative in a computer network such as the public Internet, an intranet, a virtual private network, a combination thereof, or the like. As is well-known, in the Internet paradigm as illustrated in FIG. 1, a client machine, such as machine 100, may use an application, such as a web browser 102, to access a server 104 via a computer network 106. Network 106 typically includes other servers (not shown) for control of domain name resolution, routing and other control functions. A representative server 104 is a computer or workstation having at least one processor 108, system memory (e.g., RAM) 120, disk or other permanent storage 122, I/O devices 124a-n, an operating system 126, a server program 128, and an application programming interface (API) 130 that provides extensions to enable application developers to extend and/or customize the core functionality thereof through software programs including plug-ins, CGI programs, Java servlets, and the like.

A representative server machine is a Intel Pentium® or RISC-based processor platform running an operating system (e.g., Unix, Linux, Windows, Apache, or the like) and a server program such as IBM® WebSphere® Version 2.0. Of course, any other computer hardware, operating system and/or or server software may be used.

A representative client is a personal computer, notebook computer, Internet appliance or pervasive computing device (e.g., a PDA or palm computer) that is Pentium-, PowerPC®- or RISC-based. The client includes an operating system such as Microsoft Windows, Linux, Microsoft Windows CE, PalmOS or the like. A typical client includes a suite of Internet tools including a Web browser, such as Netscape Navigator or Microsoft Internet Explorer, that has a Java Virtual Machine (JVM) and support for application plug-ins or helper applications. Communications between the client and the server typically conform to the Hypertext Transfer Protocol (Version 1.0 or higher), and such communications may be made over a secure connection. The browser includes the capability to read, interpret and process page scripts located in markup language pages retrieved by the client. As used herein, a "page script" or "script" is any set of statements, operators, objects and functions that make up a basic script designed to be interpreted and run by a browser. A page script may be written in any given scripting language. JavaScript, the most widely used scripting language, is a cross-platform, object-oriented language created by the Netscape Communications Corporation. Core JavaScript encompasses all of the statements, operators, objects, and functions that make up the basic JavaScript language. The client-side version of the language, called Client-side JavaScript (CSJS), is used in millions of web pages. The objects in CSJS enable the page author to manipulate HTML documents (checking form fields, submitting forms, creating dynamic pages, and such) and the browser itself (directing the browser to load other HTML pages, display messages, and so on). Microsoft has its own version of JavaScript, called Jscript, which is designed to run in Microsoft's Internet Explorer browser. Another version of JavaScript, called ECMA Script, has been standardized by EMCA, a European association for standardizing information and communications system. The ECMA specification is based on JavaScript 1.1 and includes the core JavaScript language. Another known scripting language is VBScript.

Figure 2:
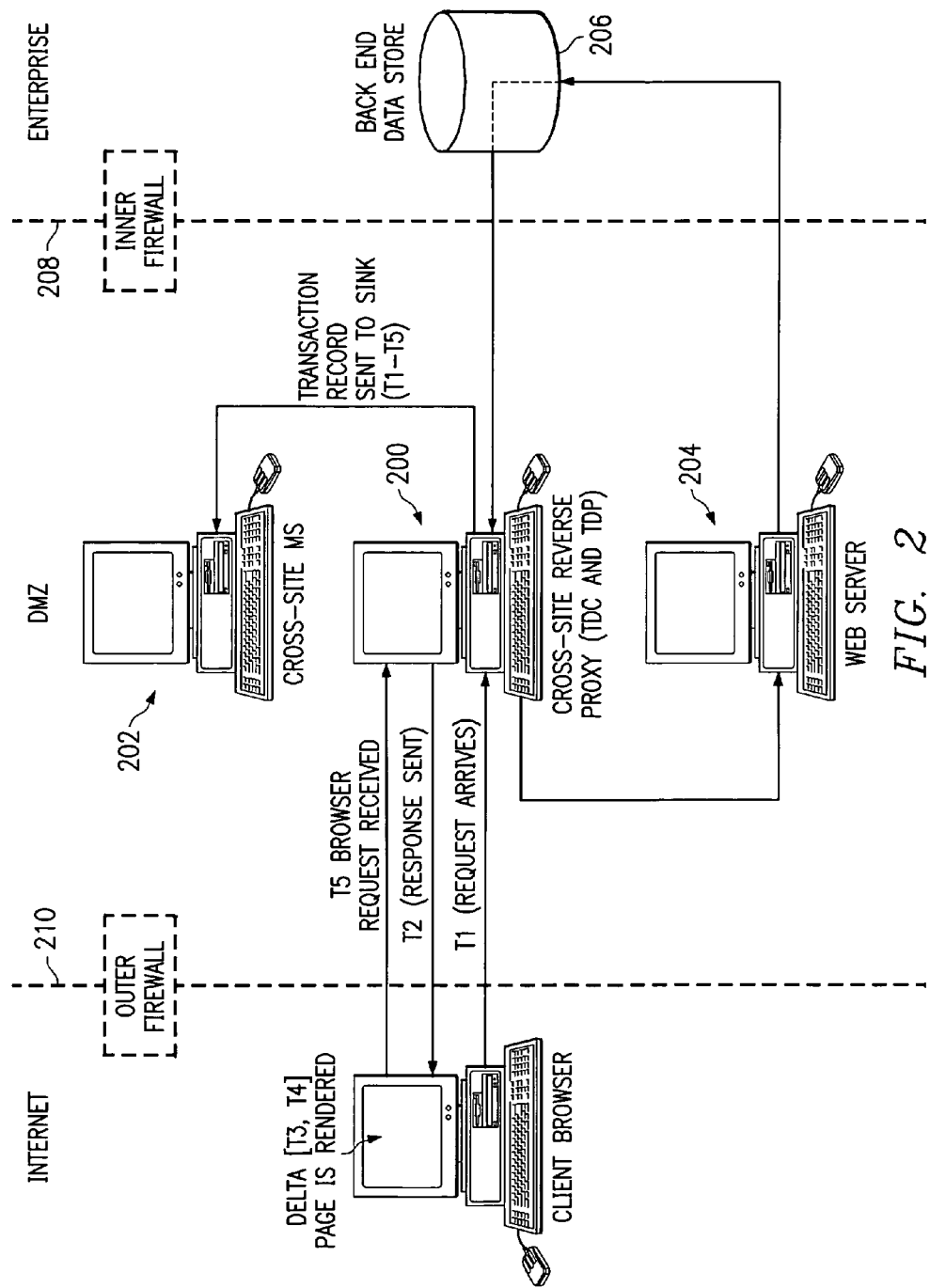
FIG. 2 is a block diagram of a client-server environment and the inventive reverse proxy of the present invention.

Referring now to FIG. 2, the inventive performance monitor preferably is implemented in a proxy 200 and its associated management server 202. As seen in the drawing, the proxy 200 and the management server 202 are each illustrated as being separate computers although this is not a limitation of the invention of course. In this example, the web server 204 has an associated back end data store 206 that is located behind an inner firewall 208. The web server 204, the proxy 200 and the management server 202 are located between the outer firewall 210 and the inner firewall 208. Again, this configuration is merely exemplary. Although not meant to be limiting, the proxy 202 is an Apache server configured in reverse proxy mode.

In operation, the proxy 200 supports an application that is capable of determining the approximate round trip time, the approximate page render time, and the request service time for an HTTP transaction in either a secure or non-secure environment. As illustrated, the application preferably is a server-side application that does not require any permanent (or temporary) installation at the client endpoint. The data collected by this application may be used to provide answers to end user questions with respect to web site performance, e.g., in the context of business-to-business and business-to-consumer e-commerce (and other) transaction environments. The application may be implemented as a Java servlet, as native code, or in any other convenient fashion, such as being built into the web server itself. One of ordinary skill will also appreciate that the invention may also be used to monitor performance criteria for other protocols besides HTTP although, for convenience, the remainder of this description will focus on this protocol.

According to the invention, the operator of the web server 204 configures the proxy into the site for monitoring server performance as will now be described. Generally, the proxy intercepts (or is configured to receive) requests directed to the server 204. The time at which a request is received at the reverse proxy (the arrival metric) is designated T1. This request is then delivered to the web server for processing. The time at which the reverse proxy receives the response stream from the web server (to be passed back to the requesting client) is designated T2. Thus, the function T2–T1 represents the approximate server response time, i.e. the amount of time taken to process the page request at the server. As will be seen, before the response stream is passed back to the requesting client, the reverse proxy "instruments" that stream by inserting a page script therein. This script, when interpreted at the client, starts a timer at time T3. When the page is completely rendered, the timer has advanced to time T4; thus, the approximate client page render or "display" time is the function T4–T3. When the page rendering is complete, the script opens a connection (e.g., a socket) back to the server and sends a packet identifying the render time. This packet is received at the reverse proxy at time T5. Thereafter, the proxy returns an acknowledgment to the client, e.g., an HTTP 204 No Content response. Any valid HTTP response (e.g., an HTTP 200 with more web content) could be sent as well. The difference between time T1 and time T5 is a relatively good approximation of the round trip time (RTT) for the entire transaction because, although the reverse proxy does not know the time at which the client request was actually issued, the time it takes for the initial client request to travel from the client to the server is approximately the same as the time difference T5–T4. The actual "on the wire" travel time for the entire transaction is then approximately ((T5–T2)–(T4–T3)).

Figure 3:
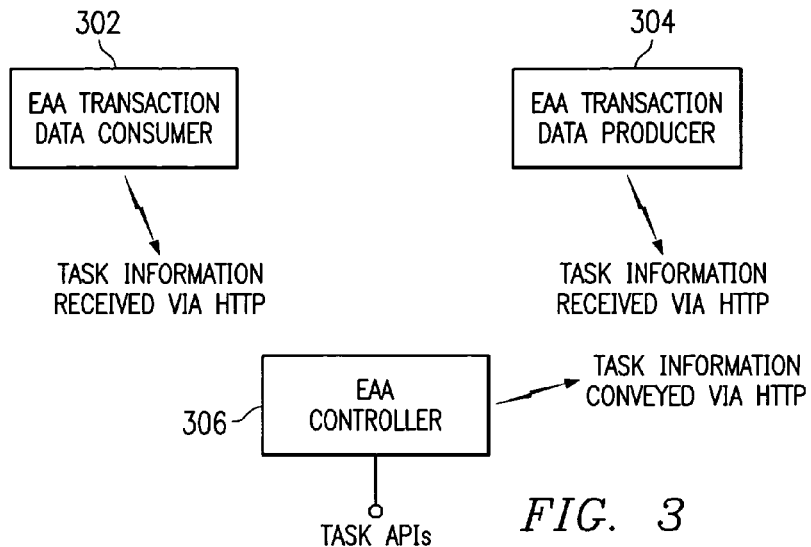
FIG. 3 is a block diagram of the three (3) sub-systems of the reverse proxy of the present invention.

Preferably, there are three (3) sub-systems that comprise the inventive monitoring application on the proxy computer. As illustrated in FIG. 3, these sub-systems include: a transaction data consumer (TDC) sub-system 302, a transaction data producer (TDP) sub-system 304, and a controller sub-system 306. As noted above, any of these components may be integrated together, of course. When a user makes a request to the web server 204 that is using the proxy, the transaction data producer 304 inspects the request, determines if the request is one that matches given criteria dictated by a set of one or more request filters (as will be described), creates a new transaction record for the request if the criteria is met, and forwards the request to the server for the target resource. When the transaction data producer 304 receives a response from the server (e.g., the requested page), it attempts to match the response with a transaction record. If a transaction record exists, the transaction data producer 304 instruments the response and forwards it back to the requesting client. As used herein, the response is instrumented by having a given script inserted into the response stream. The script is then executed on the client machine when the page is rendered, as will be seen, to generate an approximate page render time (at the client). The script is also used to open a connection to the server that is then used to deliver a packet identifying the page render time calculated by the script. As the transaction data producer 304 interacts with the client request and the server response, it is also calculating a server response time. The transaction data consumer sub-system 302 is preferably a server plug-in (e.g., a native Apache web server plug-in). When this module receives a request, it inspects the URI to determine whether this request is a result of the instrumentation supplied by the transaction data producer 304. If so, the transaction data consumer 302 produces a transaction record, having a given format, and it responds to the calling client to complete the transaction. The resultant transaction record is sent, e.g., via a socket call, to the controller sub-system 306. The controller sub-system 306 provides administrative interfaces for accepting and propagating (e.g., via HTTP POSTs) request filters and constraints to the transaction data consumer 302 and the transaction data producer 304. As will be described, the controller sub-system 306 is also a parent thread of a record sink thread, which is a server socket that accepts connections for transaction records sent to the controller by the transaction data consumer sub-system.

Figure 4:
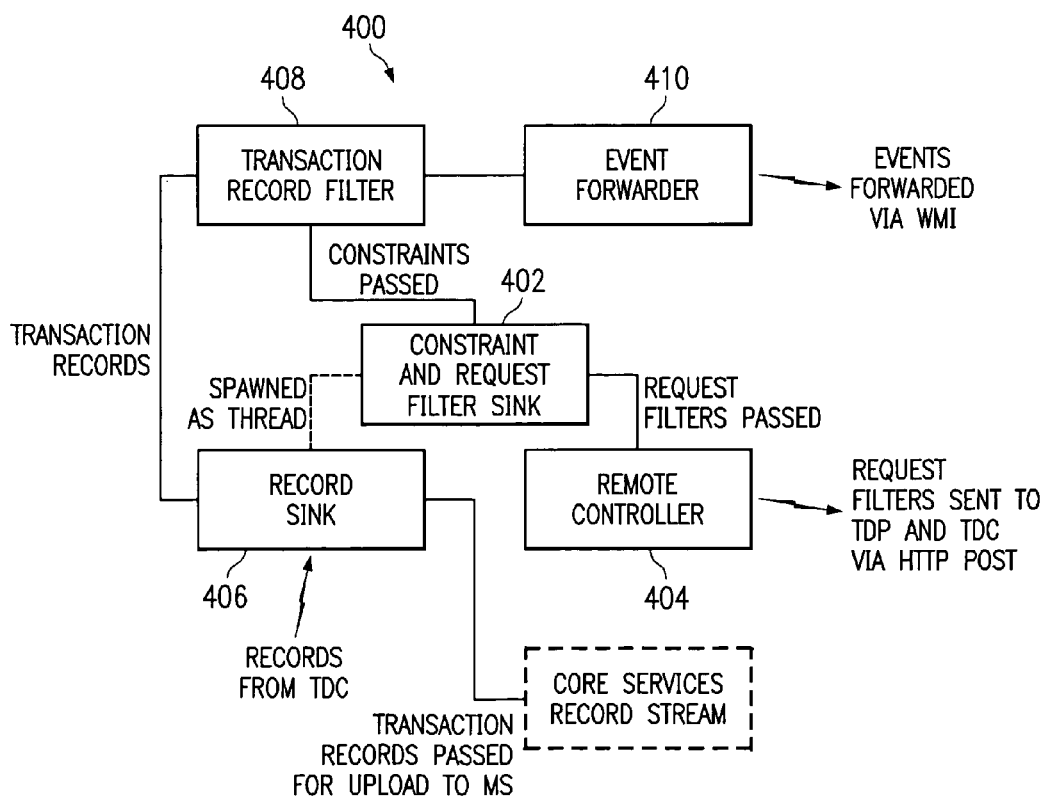
FIG. 4 is a block diagram of the controller sub-system of the invention.

FIG. 4 is a block diagram of a preferred implementation of the controller sub-system. This sub-system is user-visible portion of the application. The responsibilities for this sub-system, as described above, are: receiving task information and start/stop commands and relaying the information to the transaction data producer and the transaction data consumer sub-systems, reading the transaction records that are logged by the transaction data consumer sub-system, and forwarding any constraint violations as events to the management server. The controller sub-system 400 comprises: a constraint and request filter sink 402, a remote controller 404, a record sink 406, a transaction record filter 408, and an event forwarder 410.

The constraint and request filter sink 402 is a set of APIs that provides accessors for setting and getting the constraints and the request filters for the session. In addition, this component exposes an execute operation used by the outside world to begin the session. The sink 402 is responsible for spawning a record sink thread 406, building an HTTP POST method for the TDC and TDP sub-systems, and invoking the remote controller 404 for communication of the request filter information. The remote controller 404 component provides a communication mechanism for communicating request filter information to the TDC and TDP sub-systems. In addition, the remote controller 404 starts and stops the TDC and TDP sub-systems. The method of communication from this component to the TDC and TDP sub-systems preferably is HTTP. The record sink 406 is a server socket thread that listens for connections from the TDP sub-system. Upon receiving a request, the record sink creates a child thread that will receive the transaction record from the TDP sub-system. Each transaction record preferably is sent along two paths: (1) to the stream provided for upload to the management server, and (2) to the transaction record filter 408 for comparison against a current set of constraints. The transaction record filter 408 is responsible for comparing each received record against a current set of constraints. If one of the constraints has been violated, the transaction record filter 408 passes the record off to the event forwarder 410. The event forwarder 410 is responsible for creating an event object out of the received transaction records and forwarding those events to the management server.

Figure 5:
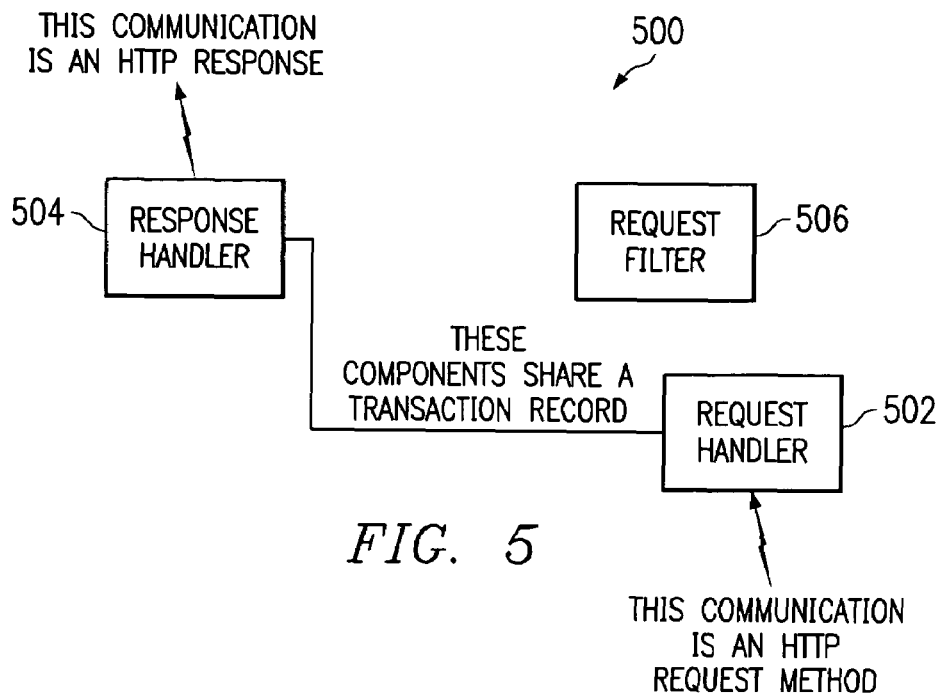
FIG. 5 is a block diagram of the transaction data producer sub-system of the invention.

FIG. 5 illustrates the transaction data producer sub-system 500 in more detail. As noted above, this sub-system receives configuration and constraint information about a current task from the controller sub-system, e.g., via HTTP requests. This sub-system is responsible for: creating transaction records for requests that meet the request filter criteria and logging the arrival metric T1, determining if a given response exists as a transaction record and updating the transaction record with the response metric T2, instrumenting the HTTP response with the gathered T1 and T2 metrics, the location of the TDC sub-system, and the script that will be used to determine the render time (T4−T3), responding to the requesting client with the instrumented response, and allowing requests that do match the request filter constraints to simply pass through the mechanism. As illustrated in FIG. 5, the transaction data producer sub-system 500 comprises a request handler 502, a response handler 504, and a request filter 506.

The request handler 502 is responsible for accepting HTTP requests from the outside world, determining if the request meets the request filter criteria, and creating a transaction record if it does. The request handler 502 then forwards the request to the web server. If the request comes from the remote controller 404 (in FIG. 4), then the request handler 502 responds appropriately to the command, e.g., by updating its constraint filter information or placing itself in an "on" or "off" mode. The response handler 504 is responsible for matching responses to transaction records when they exist. If they do exist, then the appropriate metrics gathering and page instrumentation occurs, and the instrumented response is sent to the requesting client. If matching responses do not exist, the response is simply passed through to the requesting client. Preferably, the matching is done based on the response stream being MIME type text/html (e.g., .html pages, .jsp pages .asp pages, and the like). If the original request was from the remote controller 404 (in FIG. 4), then the response handler sends a response signifying the results of the command issued during the request.

Figure 6:
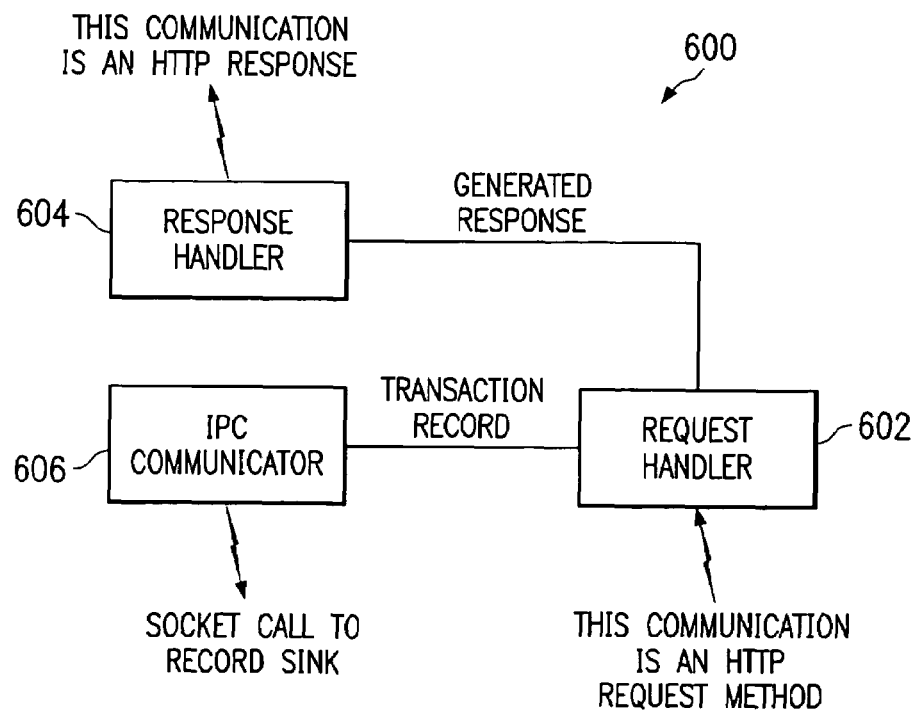
FIG. 6 is a block diagram of the transaction consumer data sub-system of the invention.

FIG. 6 illustrates the transaction data consumer sub-system 600. As described above, this sub-system receives configuration and constraint information about the current task from the controller sub-system, e.g., via HTTP requests. This sub-system then receives the results of the page instrumentation action, derives the T5 metric as a result of receiving the request, and persists the data to a log file. The TDC sub-system 600 comprises a request handler 602, a response handler 604, and an IPC communicator 606. The request handler 602 is responsible for determining if the received request has been generated as a result of the TDP instrumenting an HTTP response. If it is, then the request handler passes the transaction record to the IPC communicator 606 for propagation and asks the response handler to generate a response to the client. If the request handler receives a command from the remote controller 404 (in FIG. 4), the request handler responds appropriately to the command (e.g., creating the log file, or putting itself into "on" or "off" mode). The response handler 604 is responsible for dynamically generating a response and sending the response, via HTTP, to the client. In a simple form, the response is a 204 No Content HTTP response. However, any convenient response may be sent. If the original request was from the remote controller, then the response handler sends a response signifying the results of the command issued in the remote controller HTTP request. The IPC communicator 606 is responsible for taking the transaction records passed from the request handler 602, opening a socket to the record sink component 406 (of FIG. 4), and transmitting the transaction record to the record sink. If this operation fails, the record is persisted to a local file.

The monitoring application of the invention provides significant advantages over the prior art. As described above, the application preferably is implemented by the site provider and does not require any client-side involvement. The application monitors performance metrics for a given HTTP request, namely, approximate total round trip time, the request service time at the server, the approximate page render time at the client, and the approximate time that the transaction request is "on the wire" between the client and server. The total round trip time is estimated by calculating the difference between the final arrival time metric T5 and the initial arrival time metric T1, as measured at the reverse proxy.

The following is a representative script that is inserted into the server response stream by the proxy.

```
<script language="JavaScript">
  onload=loadHandler;
  startTime=new Date( );
  function loadHandler(e){timeDiff=new Date( )-startTime;
    location="eaa.html?RTT=512694593&ST=172&
    REC=-+-+[26/Jun/2000:09:59:12+-0500]+"GET+/+
    HTTP/1.0"+200+14393& PRT="
+timeDiff;}
</script></HEAD>
```

When this script starts, the current start time is obtained from the client machine using the startTime=new Date ( ) function. The loadHandler function is not called until the page finishes loading. Once the page is loaded, the time delta (T4-T3) is calculated using the timeDiff variable. The location directive forces an HTTP request to the URL specified, in this case "eaa.html," which represents a dummy page that is recognized by the proxy. RTT represents, in this example, the start time (T1), the time at which the original request was received at the reverse proxy.

The above-described implementation may be varied without departing from the scope of the present invention. Thus, for example, the TDP was described above as including the functionality of matching a response with a transaction record. In an alternative embodiment, such transaction table matching is not required. In particular, the entire transaction can be made stateless by appending information to the URL contained in the script. This means that the T5 request can be received by any of the data collectors, which provides additional implementation flexibility. Thus, according to this alternative implementation, all transactions are stateless and the information travels in the argument parameters of the location directive of the script. According to another variation, it is not required to relay data via a socket connection. Rather, any convenient IPC mechanism (e.g., RPC) may be used, or the information may simply be stored and gleaned from a log file.

The above-described implementation generates a RTT that may include the network or "on the wire" approximation, as has been previously described. Given that this calculation is only approximate, it may be omitted.

As noted above, the inventive mechanism is preferably implemented in client-side code (a simple page script) coupled with server-side code (in the reverse proxy that is provisioned to provide the functionality). Generalizing, the above-described functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a "client" should be broadly construed to mean any computer or component thereof directly or indirectly connected or connectable in any known or later-developed manner to a computer network, such as the Internet. The term "server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described my invention, what I claim as new and desire to secure by Letters Patent is set forth in the following claims.

The invention claimed is:

1. A method of monitoring a transaction between a client and a server in a computer network, comprising:
   at a first server time, receiving a client request directed to the server and forwarding the client request for service;
   at a second server time, inserting a script into a server response stream;
   returning the server response stream including the script in response to the client request;
   and at a third server time, receiving a packet from the client that includes a page render time generated by execution of the script at the client; and generating a transaction record that includes a performance metric data; wherein the performance metric data includes an approximate time spent on the computer network; and wherein the approximate time spent on the computer network is calculated by subtracting the page render time from a value generated by subtracting the second server time from the third server time.

2. The method as described in claim 1 wherein the performance metric data includes a server response time calculated by subtracting the first server time from the second server time.

3. The method as described in claim 1 wherein the performance metric data includes the page render time.

4. The method as described in claim 1 further including the step of storing in the transaction record information about the page requested.

5. The method as described in claim 1 further including the step of storing in the transaction record information about a protocol method used in the page request.

6. The method as described in claim 1 further including the step of issuing to the client a status response upon receipt of the packet.

7. A method operative within a firewall at a web server, comprising:
   upon receipt of a page request from a client, recording a first time T1 and forwarding the page request to the server;
   upon receipt of a response stream from the server, recording a second time T2;
   inserting a script into the response stream; forwarding the response stream together with the script back to the client;

using the script to calculate a page render time at the client by determining a difference between a fourth time T4 and a third time T3, wherein T3 is a start time when the script is interpreted at the client and T4 is a time when the page is completely rendered and upon receipt of a packet, recording a fifth time T5, wherein the packet contains performance metrics calculated using times T1 through T5 and wherein the packet is sent from the client to the server; and saving in a transaction record the performance metrics; wherein the performance metrics include a network time calculated as ((T5−T2)−(T4−T3)).

8. The method as described in claim 7 wherein the performance metrics include a request service time calculated as T2−T1.

9. The method as described in claim 7 wherein the performance metrics include a client page render time calculated as T4−T3.

10. The method as described in claim 7 wherein the performance metrics include a total round trip time calculated as T5−T1.

* * * * *